(12) United States Patent
Lang et al.

(10) Patent No.: US 8,081,329 B2
(45) Date of Patent: Dec. 20, 2011

(54) MIXED OUTPUT PRINT CONTROL METHOD AND SYSTEM

(75) Inventors: Joseph H. Lang, Webster, NY (US); Gregory Sosinski, Fairport, NY (US); Geoffrey C. Williams, Penfield, NY (US); William K. Fancher, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1144 days.

(21) Appl. No.: 11/166,581

(22) Filed: Jun. 24, 2005

(65) Prior Publication Data

US 2006/0291018 A1    Dec. 28, 2006

(51) Int. Cl.
*G06F 3/12* (2006.01)

(52) U.S. Cl. ....... 358/1.15; 399/397; 399/403; 399/407; 399/408; 399/409; 399/410

(58) Field of Classification Search ......... 399/397–410; 358/1.15
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,090,683 A * | 2/1992 | Kamath et al. | 271/227 |
| 5,095,342 A | 3/1992 | Farrell et al. | |
| 5,100,116 A * | 3/1992 | Graushar | 270/1.02 |
| 5,150,168 A * | 9/1992 | Kamath et al. | 399/402 |
| 5,159,395 A | 10/1992 | Farrell et al. | |
| 5,208,640 A | 5/1993 | Horie et al. | |
| 5,272,511 A | 12/1993 | Conrad et al. | |
| 5,316,279 A * | 5/1994 | Corona et al. | 270/1.01 |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |
| 5,646,740 A * | 7/1997 | Webster et al. | 358/296 |
| 5,710,968 A | 1/1998 | Clark et al. | |
| 5,724,642 A * | 3/1998 | Cala | 399/364 |
| 5,778,377 A | 7/1998 | Marlin et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — James A Thompson
*Assistant Examiner* — Benjamin O Dulaney
(74) *Attorney, Agent, or Firm* — Fay Sharpe LLP

(57) ABSTRACT

A merging module connects two printing systems at approximately 90 degrees to one another. The merging module includes a sheet rotator in a plane that is common to the paper paths of both print engines and a buffer. It also includes two bypass paths (one above and one below the rotator) to route the two paper paths around the rotator and enable both print engines to deliver their output to the appropriate finishing device as well as to the buffer.

16 Claims, 10 Drawing Sheets

U.S. PATENT DOCUMENTS

| | | | |
|---|---|---|---|
| 5,810,346 A * | 9/1998 | Jorg | 270/59 |
| 5,884,910 A | 3/1999 | Mandel | |
| 5,995,721 A | 11/1999 | Rourke et al. | |
| 6,059,284 A | 5/2000 | Wolf et al. | |
| 6,076,080 A * | 6/2000 | Morscheck et al. | 705/400 |
| 6,125,248 A | 9/2000 | Moser | |
| 6,241,242 B1 | 6/2001 | Munro | |
| 6,269,237 B1 * | 7/2001 | Olbrich et al. | 399/401 |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,474,806 B2 * | 11/2002 | Terauchi et al. | 347/104 |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,819,906 B1 | 11/2004 | Herrmann et al. | |
| 7,010,242 B2 * | 3/2006 | Suzuki et al. | 399/110 |
| 7,093,831 B2 * | 8/2006 | Biegelsen et al. | 271/184 |
| 7,175,173 B2 * | 2/2007 | Anzai et al. | 270/58.09 |
| 2002/0015605 A1 * | 2/2002 | Otaki | 399/405 |
| 2002/0018235 A1 * | 2/2002 | Ryan et al. | 358/1.15 |
| 2002/0025207 A1 * | 2/2002 | Yoshie et al. | 399/407 |
| 2002/0078012 A1 | 6/2002 | Ryan et al. | |
| 2002/0103559 A1 | 8/2002 | Gartstein | |
| 2003/0002447 A1 * | 1/2003 | Jackson et al. | 370/254 |
| 2003/0077095 A1 * | 4/2003 | Conrow | 399/364 |
| 2003/0190179 A1 * | 10/2003 | Kinoshita et al. | 399/401 |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 * | 12/2004 | Lofthus et al. | 400/582 |
| 2005/0023742 A1 * | 2/2005 | Tamura et al. | 270/58.08 |
| 2005/0053404 A1 * | 3/2005 | Zeller et al. | 400/76 |
| 2005/0121847 A1 * | 6/2005 | Anzai et al. | 270/58.08 |
| 2005/0158098 A1 * | 7/2005 | Mandel et al. | 399/407 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.

* cited by examiner

MIXED OUTPUT PRINT CONTROL METHOD AND SYSTEM

BACKGROUND

Illustrated herein are methods and systems relating to image and document production. Embodiments will be described in detail with reference to electrophotographic or xerographic marking or printing engines. However, it is to be appreciated that embodiments associated with other marking or rendering technologies are contemplated.

Traditionally, a printer prints a job as the job arrives to the printer. In a networked printer environment, a network server presents the jobs queued at the network to the printer for printing sequentially. The printer is traditionally a two-phase work center. In the first phase of the printing function, the printer processes the job for rasterization. The process is known as raster image processing (or RIP). In the second phase of the printing function, the printer prints the job.

In order to provide increased production speed, document processing systems that include a plurality of printing or marking engines have been developed. Incorporated by reference, by way of background and where appropriate, are the following references relating to what have been variously called "tandem engine" printers, "cluster printing," "output merger" and the like: U.S. Pat. Nos. 4,579,446; 4,587,532; 5,272,511; 5,568,246; 5,570,172; 5,995,721; 5,596,416; 6,402,136; a 1991 "Xerox Disclosure Journal" publication of November-December 1991, Vol. 16, No. 6, pp. 381-383; and the Xerox Aug. 3, 2001 "TAX" publication product announcement entitled "Cluster Printing Solution Announced."

These "cluster printing systems" enable high print speeds or print rates by grouping a number of slower speed marking engines in parallel. The systems are very cost competitive and have an advantage over single engine systems because of their redundancy. For example, if one marking engine fails, the system can still function at reduced throughput by using the remaining marking engines. However, to print jobs containing a mix of monochrome, MICR (Magnetic Ink Character Recognition) or color prints with cluster printing systems, print shops typically split the job into parts and run those parts on separate color, MICR or monochrome print engine, transferring the output prints to either an off-line collator or to an in-line inserter to assemble the pages into the job correctly. Alternatively, the customer may have to run the entire monochrome+color job on a color machine or run a monochrome+MICR job on a MICR machine. Both of these cases result in a higher printing cost for the job.

In this regard, several companies provide elementary mixed color and monochrome page job processing software, such as Xerox FreeFlow, EFI Balance, and SOFHA Multi-FLOW. Typically, the mixed color/monochrome job is rasterized or "RIPped" a first time and all color pages are printed on a color printer. A job ticket is automatically created. The job ticket programs the color pages as inserts into the monochrome print stream. The color pages are then unloaded from the color printer and placed in an inserter tray in the monochrome engine. The job is then run again, this time printing all the monochrome pages. The pre-programmed job ticket inserts the color pages into the mono page stream in the correct location. While this process is somewhat simpler than performing these tasks entirely manually, it does require human interaction that is both time intensive and error prone in that the color pages may be loaded in incorrect order, with incorrect orientation and the like.

Thus, there is a need for a means to provide the customer the ability to print mixed output jobs (e.g., monochrome+color, monochrome+MICR, etc.) automatically as a single integrated job, while still allowing the customer the flexibility to use that same equipment to run separate monochrome and color or MICR jobs simultaneously without reconfiguring the hardware.

CROSS-REFERENCE TO RELATED APPLICATIONS

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/089,854, filed Mar. 25, 2005, entitled "SHEET REGISTRATION WITHIN A MEDIA INVERTER," by Robert A. Clark et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.; and U.S. application Ser. No. 11/109,566, filed Apr. 19, 2005, entitled "MEDIA TRANSPORT SYSTEM," by Mandel et al..

BRIEF DESCRIPTION

Aspects of the present disclosure in embodiments thereof include a system and method for printing mixed output jobs automatically as a single integrated job. More particularly, a merging module connects two print systems at approximately 90 degrees to one another. The merging module includes a sheet rotator in a plane that is common to both the paper paths of both print engines. It also includes two bypass paths (one above and one below the rotator) to route the two paper paths around the rotator and enable both print engines to deliver their output to the appropriate finishing device. The merging module can be configured so that it can accommodate various production print engine families such as Nuvera, DocuTech, or Docucolor products from Xerox Corporation.

In one embodiment, a method includes starting a mixed output print job having a predetermined number of document sets to be printed and determining whether the output from a first print engine will be merged with the output of a second print engine to form a combined output. In the event that the outputs of the print engines are to be merged, then there is a determination as to whether the combined output will be delivered to a first finisher or to a second finisher. Where the output is to be delivered to the first finisher, then the method includes sending the output from the first print engine to a first bypass transport, processing the output from the second print engine through the rotate and redirect transport, merging the output from the first and second print engines to form the combined output, and delivering the combined output to the first finisher. Where the output is to be delivered to the second finisher, the method includes processing the output from the first print engine through the rotate and redirect transport, buffering the output from the second print engine via a multi-sheet buffer having a plurality of buffer bins, transporting the buffered output to a second bypass transport, merging the outputs from the first and second print engines to form the combined output, and delivering the combined output to the second finisher.

In another embodiment, a system comprises a first marking engine, a second marking engine, at least one finisher, a merging module including at least one rotate and redirect path, a first bypass path, and a second bypass path, and a multi-sheet buffer.

In yet another embodiment, an apparatus for a marking system having at least two marking engines and at least one finisher comprises a merging module including at least one rotate and redirect paper path, a first bypass path and a second bypass path and a multi-sheet buffer.

DETAILED DESCRIPTION

Figure 1:
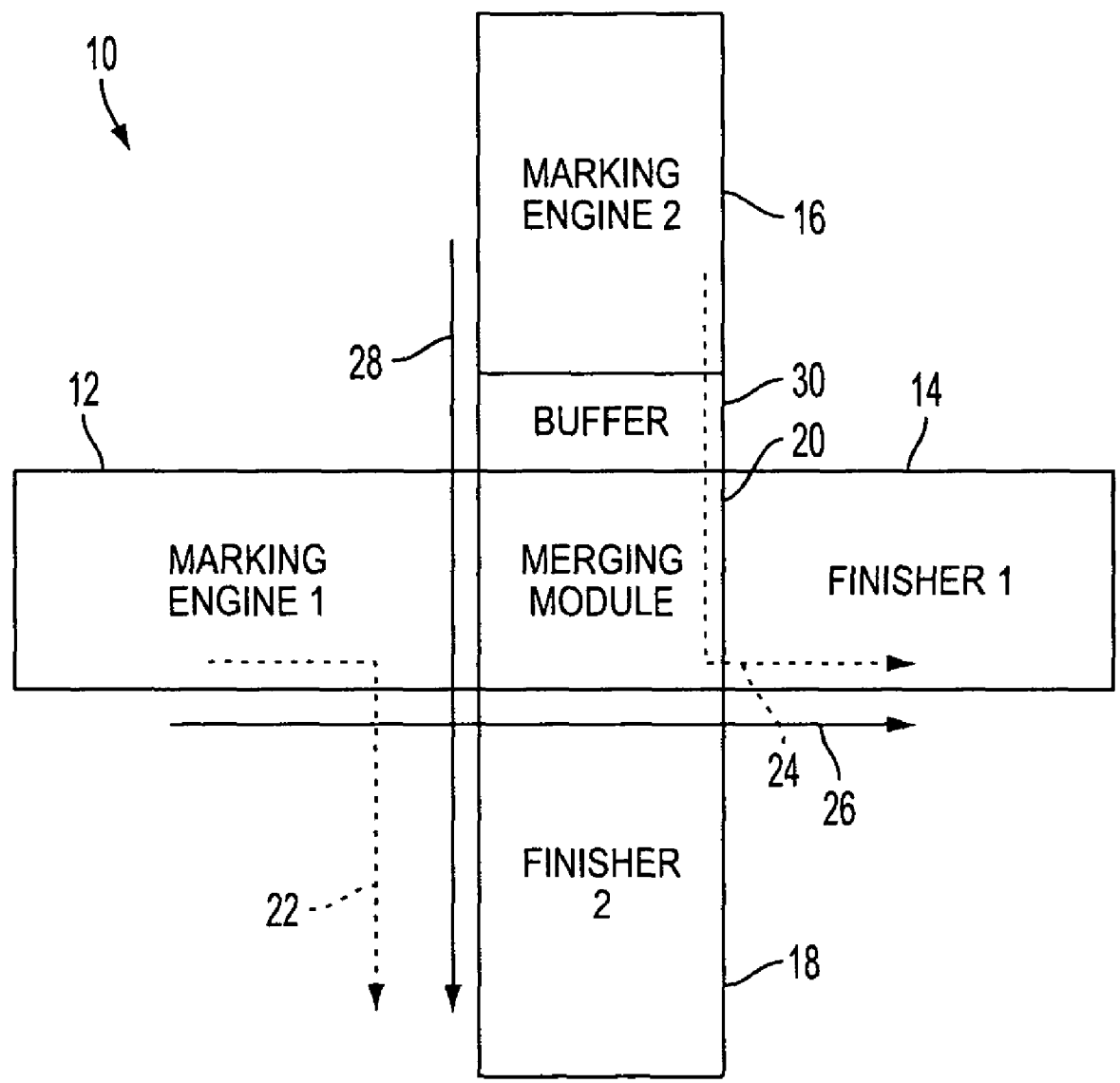
FIG. 1 is a simplified block diagram of an image rendering system incorporating a merging module and a buffer.

FIG. 1 illustrates an image (or document) rendering (or printing) system 10 such as a xerographic printing system, which is suitable for incorporating embodiments of the methods and systems disclosed herein. The printing system 10 includes a first marking or printing engine 12 (e.g., a monochrome, color or MICR marking engine), a corresponding first finisher 14, a second marking engine 16 (e.g., a color, MICR or second monochrome marking engine), and a corresponding second finisher 18. The image rendering system 10 further includes a merging module 20 for mixed output print control, which contains several paths for print media (e.g., paper), including at least one "rotate and redirect" path 22 (a second path 24 is shown in FIG. 1), a first "bypass" path 26, and a second "bypass" path 28.

As known in the art, the printing system 10 typically includes any number of image output terminals (IOT) and image input devices, such as a scanner, imaging camera or other device. Each image output terminal typically includes a plurality of input media trays and an integrated marking engine (e.g., the first marking engine 12).

Each of the finishers 14, 18 typically includes main job output trays. Depending on a document processing job description and on the capabilities of the finishers 14, 18, one or both of the main job output trays may collect loose pages or sheets, stapled or otherwise bound booklets, shrink wrapped assemblies or otherwise finished documents. The finishers 14, 18 receive sheets or pages from the merging module 20 and process the pages according to a job description associated with the pages or sheets and according to the capabilities of the finishers 14, 18. Of course, it is to be understood that the printing system 10 may include only one finisher or more than two finishers, depending upon the needs of the system 10 and/or the user.

Local controls (not shown) orchestrate the production of printed or rendered pages, their transportation over various path elements (e.g., 22, 24, 26, and 28 and 148), and their collation and assembly as job output by the finishers 14, 18. Rendered (or printed) pages or sheets may include images received via facsimile, transferred to the document processing system from a word processing, spreadsheet, presentation, photo editing or other image generating software, transferred to a document processor over a computer network or on a computer media, such as, a CD ROM, memory card or floppy disc, or may include images generated by the image input devices of scanned or photographed pages or objects.

Thus, the output at the first finisher 14 may consist of, for example, monochrome 1 (first monochrome printer) sets, a monochrome 1 set with color inserts, a monochrome 1 set with MICR inserts, or a monochrome 1 set with monochrome 2 (second monochrome printer) inserts. Likewise, the output at the second finisher 18 may consist of color, MICR or monochrome 2 sets or color, MICR, or a monochrome 2 set with monochrome 1 inserts.

The "rotate and redirect" paper paths 22, 24 shown in FIG. 1 take in either a monochrome or color print stream and rotate the sheets (or pages) of print media (or paper) and change their feed direction approximately 90 degrees to insert into the alternate engine print stream where scheduled. This may be accomplished, for example, via two independently driven nip sheet rotators similar to that used in the C. P. Bourg DS5000 or the Nuvera FTM (Finisher Transport Module) or the like. Of course, it is to be understood that there are also other means to provide rotate and translate functions as known to those skilled in the art.

Two marking engines can print and deliver their outputs simultaneously and independently shown by the following in FIG. 1. The first "bypass" path 26 is where a decision gate diverts, for example, monochrome sheets from the first marking engine 12 down and under the rotate and redirect path 22/24 and then back up to the proper level so that the sheets can exit to the first finisher 14. Likewise, the second "bypas" path 28 is where a decision gate diverts, for example, the color sheets from the second marking engine 16 up and over the rotate and redirect path 22/24 and then back down to the proper level so that the sheets can exit to the to the second finisher 18. The first and second "bypass" paths 26, 28 are at approximately 90 degrees to one another.

The merging module 20 also incorporates a multi-page buffer 30 such that n number of sheets (e.g., color) can be scheduled and printed ahead and then held in the buffer 30 until they are needed to be fed into the print stream. This enables a low speed color marking engine, for example, to be used along with a high speed monochrome marking engine.

Thus, for instance, let us assume that a 100 ppm (pages per minute) monochrome marking engine and a 25 ppm color marking engine are mated with the merging module 20 for a mixed output print job. If the merging module 20 contains a five-page buffer, then up to five consecutive color pages could be RIPped, scheduled, printed and held in the buffer 30 until they are needed. In this manner, up to five consecutive color pages could be inserted into the monochrome print stream without any slow down of the monochrome marking engine. More than five consecutive color pages would require dead cycles of the monochrome engine for the amount of time needed for the color engine to print the required next page. An appropriate buffer size (i.e., >1) would need to be determined.

The general operation of the printing system 10 and the merging module 20 is described below. Let us assume, in this instance, that the first marking engine 12 is a monochrome marking engine and that the second marking engine 16 is a color marking engine. In this case, FIGS. 2 and 3 represent views of the merging module 20 from the monochrome engine 12 (marking engine 1) side and the color engine 16 (marking engine 2) side, respectively.

Figure 2:
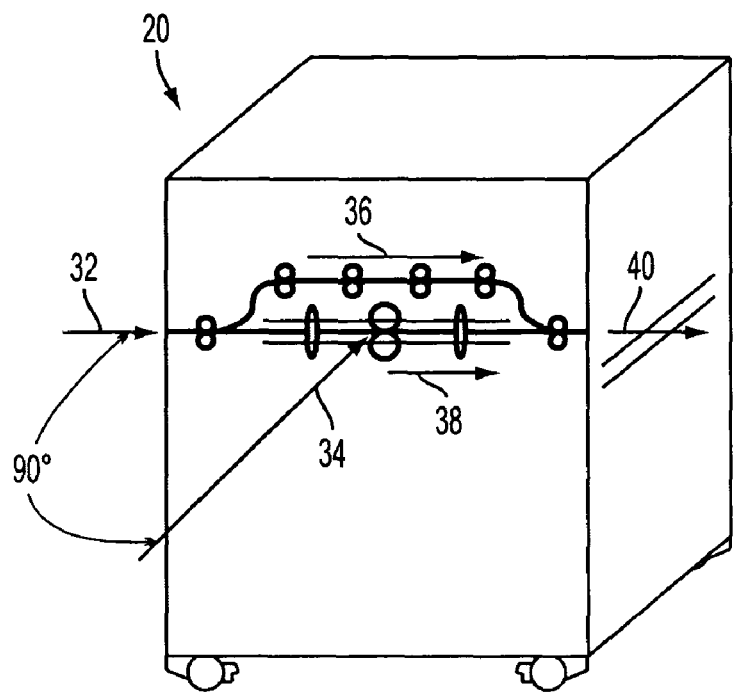
FIG. 2 represents a view of the merging module from the monochrome engine (marking engine 1) side.

Turning our attention to FIG. 2 first, as represented by arrow 32, color prints would enter the merging module 20. As represented by the arrow 34, monochrome prints would enter the merging module 20 at approximately a 90 degree angle from the color prints. As represented by the arrows 36, color prints would follow the upper bypass path 28. As represented by the arrow 38, monochrome prints would enter path 22, be rotated, and then redirected into the color print stream. The output 40 would be color prints with monochrome inserts.

Figure 3:
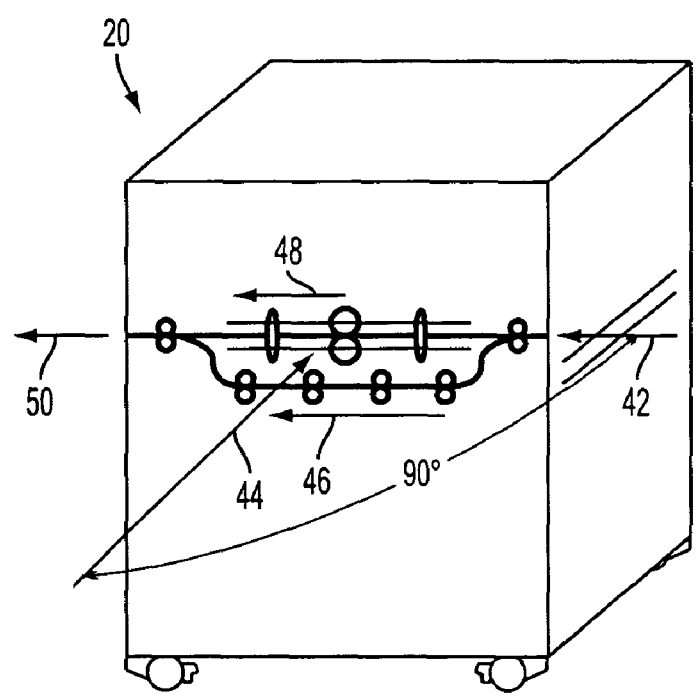
FIG. 3 represents a view of the merging module from the color engine (marking engine 2) side.

Turning now to FIG. 3, as represented by arrow 42, monochrome prints would enter the merging module 20. As represented by the arrow 44, color prints would enter the merging module 20 at approximately a 90 degree angle from the monochrome prints. As represented by the arrows 46, color prints would follow the lower bypass path 26. As represented by the arrow 48, monochrome prints would enter path 22, be rotated, and then be merged into the color print stream. The output 50 would be monochrome prints with color inserts.

Figure 4:
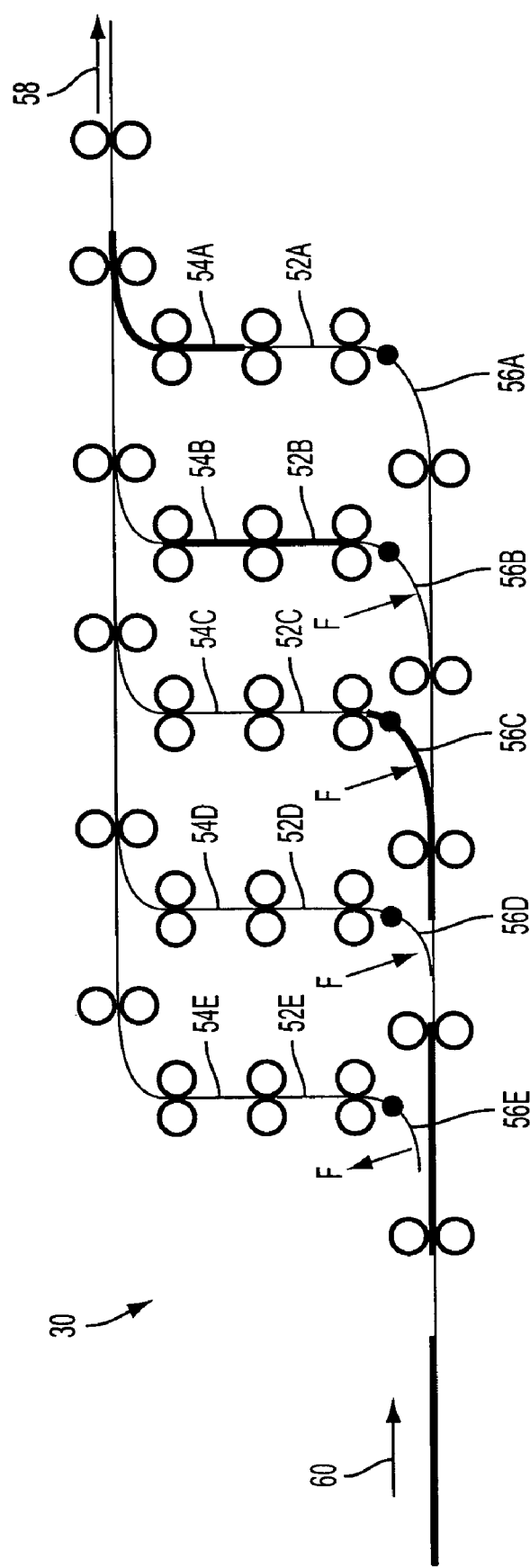
FIG. 4 is a block diagram of the buffer shown in FIG. 1.

FIG. 4 shows the multi-sheet buffer 30 in more detail. As shown in FIG. 4, the buffer 30 is a five-sheet buffer. It is to be understood, however, that the multi-page buffer 30 may contain any number of sheet buffers 52. Each sheet buffer 52 is long enough to contain the largest sheet length entirely. Each buffer path 54 has a controllable decision gate 56 to direct the sheets to enter it upon demand. Each sheet buffer 52 has separate drive control of the nip rollers for each buffer path 54 to allow the sheet to be transported, stopped and restarted as needed. A paper sensor may be included to sense where the sheet lead or trail edge is in the path. The paper sensor could be located, for example, near the lead edge of the sheet when it is held in the buffer. All buffer paths 54 merge to an exit transport 58 to enter the merging module 20. As represented by the arrow 60, sheets may enter the multi-page buffer 30 from the second marking engine 16.

In FIG. 4, arrow "F" represents the direction of the decision gate actuation force. For example, when the arrow is pointed down, the gate is located in a manner to guide the sheet into the respective buffer. When arrow F points upward, it allows the sheet to pass by the respective buffer to the next downstream buffer. Thus, the first buffer path 54A is shown feeding a sheet out. In regard to the second buffer path 54B, a decision gate is down and a sheet is stopped in the buffer. In regard to the third buffer path 54C, a decision gate is down and a sheet is being driven into the buffer. In regard to fourth buffer path. 54D, a decision gate is down and preparing for the next sheet to enter the buffer. In regard to the fifth buffer path 54E, the decision gate is up as the previous sheet passes to the fourth buffer.

Figure 5:
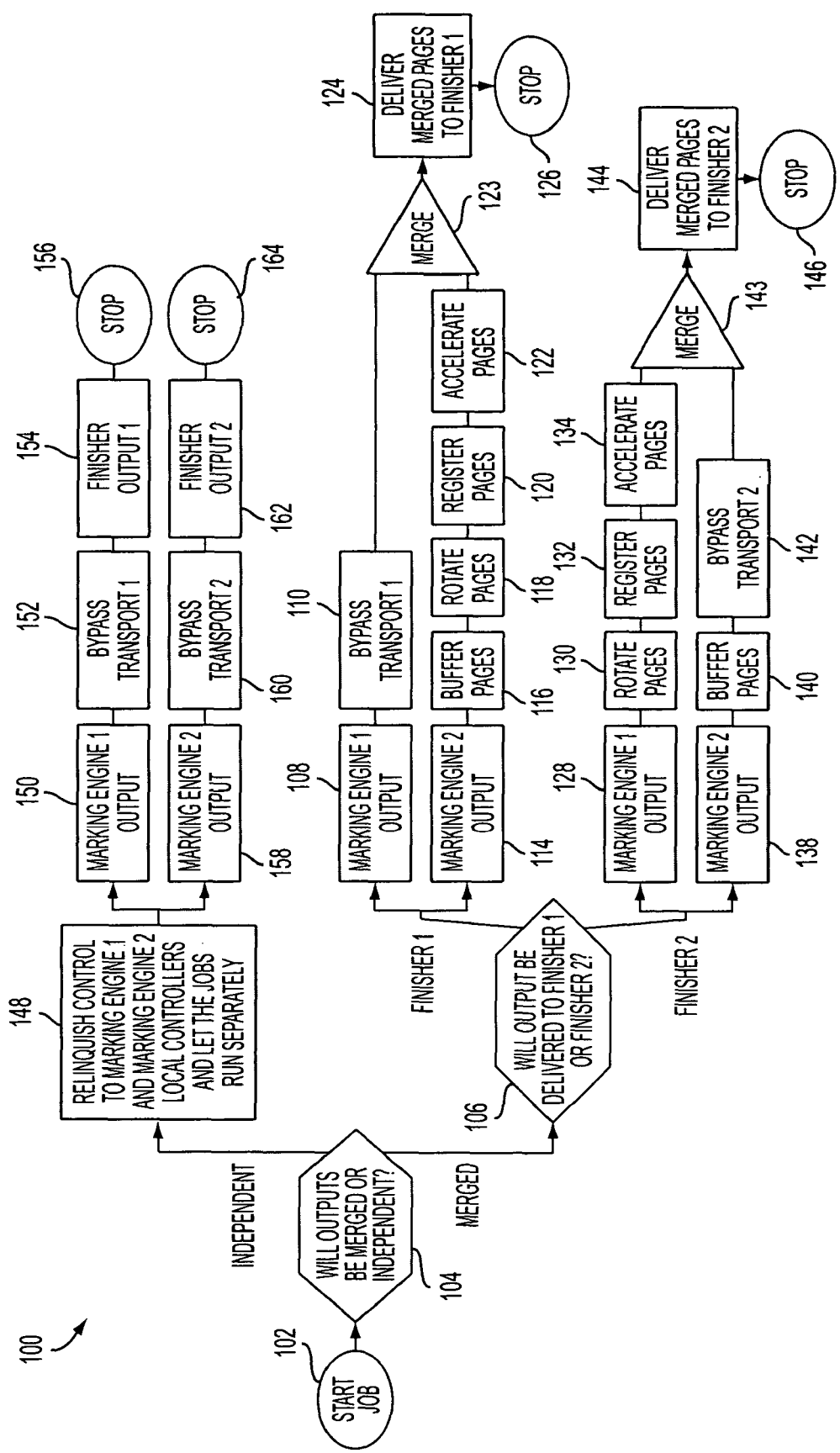
FIG. 5 is a flow chart of a mixed output printing control method using the printing system of FIG. 1

FIG. 5 illustrates a mixed output printing control method 100 using the image rendering system 10 of FIG. 1. Initially, the system 10 receives an indication that a mixed output (in this case, color-monochrome) print job is to start (e.g., the job is started by the user manually or automatically) (102). Next, a determination is made as to whether the mixed output (i.e., the color and monochrome outputs) will be merged or not (104). If the system 10 receives an indication that the outputs from the print engines are to be merged, then another determination is to be made, i.e., whether the combined output will be delivered to the first finisher 14 or to the second finisher 18 (106). Of course, if there is only one finisher in the system 10, then this determination is not necessary.

If the system 10 receives an indication that the combined output is to be delivered to the first finisher 14, then the output from the first marking engine 12 (108) is transported to the first bypass transport (110). In addition, the output from the second marking engine 16 (114) will be processed, i.e., the sheets will be buffered (116), rotated (118), registered (120), and accelerated (122). Each of the outputs from the first and second marking engines 12, 16 will then be merged (123). The merged pages (or the combined output) will be delivered to the first finisher (124), and the job will stop (126).

However, if the combined output is to be delivered to the second finisher 14, then the output from the first marking engine 12 (128) is rotated (130), registered (132), and accelerated (134), while the output from the second marking engine 16 (138), is buffered (140) and transported to the second bypass transport (142). Each of the outputs from the first and second marking engines 12, 16 are then merged (143). The merged pages (or the combine output) are then transported to the second finisher 18 (144), and the job is stopped (146).

Now, if the outputs are to remain independent, then control may be relinquished to the local controls of the first and second marking engines 12, 16 and the jobs are run separately (148). Alternatively, the outputs from the respective marking engines may be controlled may be controlled by a single controller. Thus, the output of the first marking engine 12 (150) is transported to the first bypass transport (152) and then on to the output of the first finisher 14 (154). The first print job is then stopped (156). Likewise, the output of the second marking engine 16 (158) is sent to the second bypass transport (160) and then on to the second finisher 18 (162). Again, the second print job is then stopped (164).

Thus, a mixed output color-monochrome print job may be decomposed into separate color and monochrome print jobs. The color pages would be RIPped and sent to the color marking engine, while the monochrome pages would be RIPped and sent to the monochrome marking engine. For example, if page 7 is the first color page in a set, it is printed on the color marking engine and delivered to the buffer where it is held in buffer bin #1. Once page 7 is recognized as a color page, a merging controller scheduler (not shown) may be used to schedule the monochrome printer to skip page 7 (skip a pitch) in the monochrome job and the color insert is fed from the buffer bin #1 into the skipped pitch location in the job. This scenario repeats for each color page in the set.

The merging controller scheduler may be based, for example, on Xerox FreeFlow™ Output Manager. Output Manager has Black/Color job splitting capability as well as the capability of load balancing (job splitting) across multiple printers. The merging controller scheduler generally consists of a separate PC on which a software program such as FreeFlow and the controls for the merging module 20 could reside. Also, the merging controller scheduler could become an additional module in FreeFlow such as where Output Manager is located.

The merging controller scheduler keeps track of which color page is located in which buffer bin location. Whenever a color page is fed from a buffer bin, the next color page is scheduled to be printed and delivered to the empty buffer bin location until the required number of sets is completed and the end of job is encountered.

For job validation purposes, particularly for MICR check insertion jobs, the following characteristics may be tracked and incremented/decremented for each page as the job is processed: Job #, Set #, page #, bin location, color printer page #, mono printer page #.

The color pages are "printed ahead" of the monochrome job such that the color page buffer is maintained in a full state. This enables pairing low speed (and low cost) color and high speed monochrome printers together.

If the number of consecutive color pages in a job is larger than the buffer size, then dead cycles need to be scheduled for the monochrome marking engine for the amount of time needed for the color marking engine to print the required next page and deliver it to the merging module 20.

The color and monochrome print jobs can run simultaneously, thereby delivering completed first sets faster than current state of the art whereby the color marking engine must complete all the color pages prior to running the monochrome job.

The printing system 10 includes the multi-sheet buffer 30, which enables the ability to feed color inserts in any order from the full buffer enabling the ability to reorder the color inserts on the fly. One way in which this might be useful is to "hold" defective prints in the buffer 30 and reschedule and replace the defective print with a "good" print.

Whenever a color page is inserted into a black page stream the color page is directed to the rotator transport by a gate. Sensors in the rotator transport may detect the sheet presence and location and apply the rotation algorithm to the sheet. Once the sheet is rotated, the lead edge location of the paper is sensed and the paper is accelerated to a velocity to match the bypass transport paper speed and the color page is rotated and redirected into the monochrome print stream.

Figure 6:
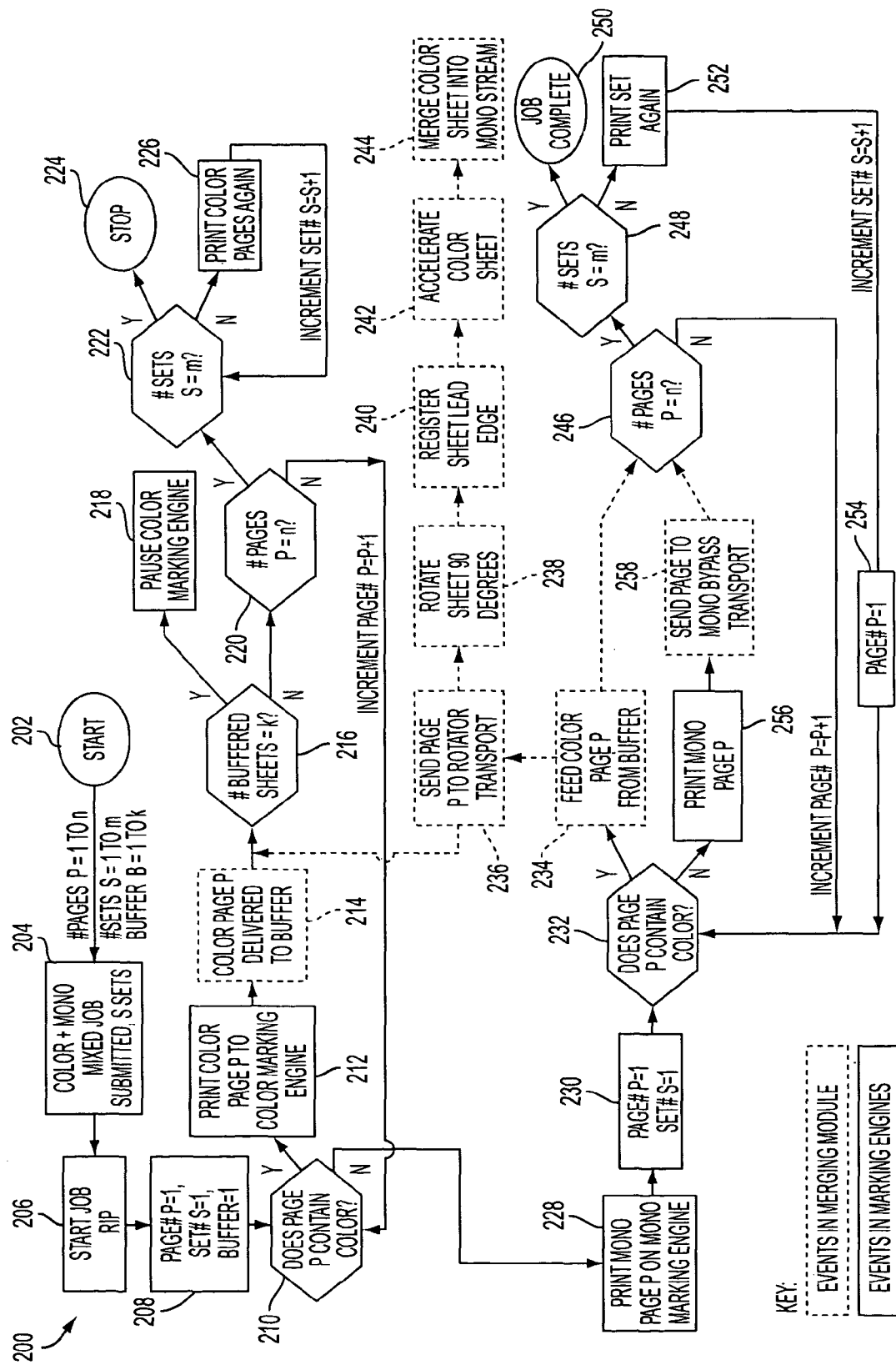
FIG. 6 is a flow chart illustrating a color-monochrome job control utilizing the merging module.

FIG. 6 is a further example in which a color-monochrome print job control method 200 utilizes the print system 10 and the merging module 20. Initially, the print job is specified and started (202). At this time, the key parameters, namely, the number of pages, P, the number of sets, S, and the number of sheets in the buffer, B, are set as follows: P=1 to n, S=1 to m, and B=1 to k. Next, the color-monochrome mixed job is submitted containing S sets (204). The job is then "RiPped" (206). The page number is set to P=1, the set number is set to S=1 and the buffer 30 is set to B=1 (208). Next, a determination is made as to whether the page P contains color (210). If the page does contain color, then the color page P is printed on marking engine 16, which in this case produces color pages (212). The color page P is then delivered to the buffer 30 (214). Next a determination is made as to whether the number of buffered sheets equals k (216). If yes, then the color marking engine 16 is paused (218). If not, then a determination is made as to whether the number of pages P=n (220). If the number of pages does equal n, then a determination is made as to whether the number of sets S=m (222). If the number of sets does equal m, then the job stops (224). However, if the number of sets S does not equal m, then the color pages are printed again (226) and the set of number of sets S is incremented by 1. Next, a further determination is made as to whether S=m (222).

If the page does not contain color, then the monochrome page P is printed on marking engine 12, which in this case produces monochrome pages (228). Next, the page number is set to P=1 and the set number is set to S=1 (230). Next, a determination is made as to whether the page P contains color (232). If the page P does contain color, then the color page P is fed from the buffer 30 (234) and the page P is sent to the rotate and merge transport (236). There, the sheet is rotated approximately 90 degrees (238), the lead edge of the sheet is registered (240), the color sheet is accelerated (242), and then the color sheet is rotated and redirected into the monochrome stream (244). In addition to rotating, registering and accelerating the sheet, upon sending the page p to the rotate and redirect transport, a determination is made as to whether the number of buffer sheets B=k (216). If the number of buffered sheets B is not equal to k, then an additional color page is printed via steps (220), (210), (212) and so on.

Additionally, upon feeding the color sheet from the buffer 30, a determination is made as to whether the number of pages P=n (246). If yes, then a determination is made as to whether the number of sets S=m (248). If the answer is yes, then the job is complete (250). However, if the number of sets does not equal m, then a set is printed again (252) and the set number is incremented by one. Further, the page number is set to P=1 (254). If at step (246) the number of pages P does not equal n, then, the page number is incremented by one and the process returns to step 232. Finally, if the page P does not contain color, then the monochrome page P is printed (256) and the page is sent to the monochrome bypass path 26 (258) and back to step 246.

The embodiments described above can be useful to connect two monochrome marking engines that run at either the same or different speeds. For marking engines of the same nominal 100 pages per minute speed, no two run at exactly the same speed. For instance, one marking engine might run 100.1 ppm, and another marking engine might run 98.8 ppm. During a one minute job length they will produce different numbers of pages. The buffer can be used to synchronize cluster printing between two slightly different speed engines storing at least one page in the buffer to avoid skipping pitches.

There are also cases where two monochrome marking engines get out of synchronization due to scheduled operation such as automatic adjustments like toner concentration adjustment, image processing time variation due to simple or complex images, paper misfeed or multifeed, jam clearance actions, etc., which interrupt the normal full productivity. The buffer can be used to "absorb" some of these occurrences so that one monochrome engine acts as the master and the other the buffered slave. For cases where the master has a failure, the slave can take over the job and complete the pages.

For two monochrome marking engines of the same or different speeds running duplex mode for an internal racetrack duplex architecture printer, the controller and buffer can be used to effectively double the ppm throughput rate. The controller is setup to run duplex mode prints on both engines alternating between the 2 engines. For example, marking engine 1 begins printing sides 1 for duplex pages 1, 2, 3, 4 for a 4 page duplex path system. When marking engine 1 starts printing side 2, marking engine 2 begins printing sides 1 of pages 5, 6, 7, 8. Marking engine 1 completes sides 2 and delivers the pages 1, 2, 3, 4 through the merging module 20 to the finisher. Marking engine 2 then completes pages 5, 6, 7, 8 and delivers them to the buffer, to the merging module rotator, and then to the finisher. The ideal buffer size is one which is equal to the duplex path length in pages plus one page to absorb any speed variation between marking engines.

The merging concept described above enables higher utilization of high speed third party finishing devices by having more than one printer feed pages to the finishing device. The throughput rate for many commercial finishing devices is significantly higher than the printers speed. By mating two printers via the merging module 20, the page throughput rate can be doubled for the finisher thereby improving its utility. The approximately 90 degree rotation direction in the merging module 20 can be controlled via the merging controller scheduler to enable customization if required.

Figure 7:
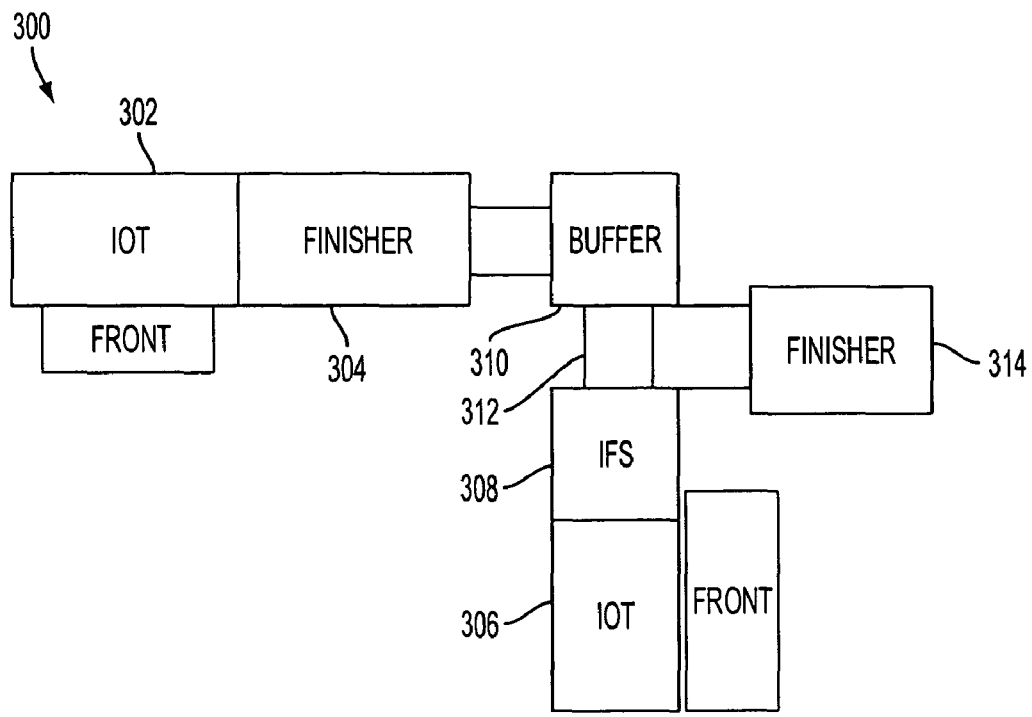
FIG. 7 is a block diagram of an alternative printing system.

The merging system and method described herein can be used to mate and control many combinations of engines, including, but not limited to:
monochrome+color
monochrome+MICR
color+MICR
monochrome+monochrome
color+color
MICR+MICR FIGS. 7-13 illustrate alternative embodiments of the systems and methods disclosed above. For example, FIG. 7 shows a system 300, which includes a first image output terminal (IOT) 302, a first finisher 304, such as a Xerox DocuTech 6180 printer, along with a second IOT 306 and an attached feeder stacker module (IFS) 308 coupled to a buffer 310. The buffer 310 includes a "bump and turn" (90 degree sheet rotation mechanism). The outputs are rotated and redirected and transported to the finisher 314.

Figure 8:
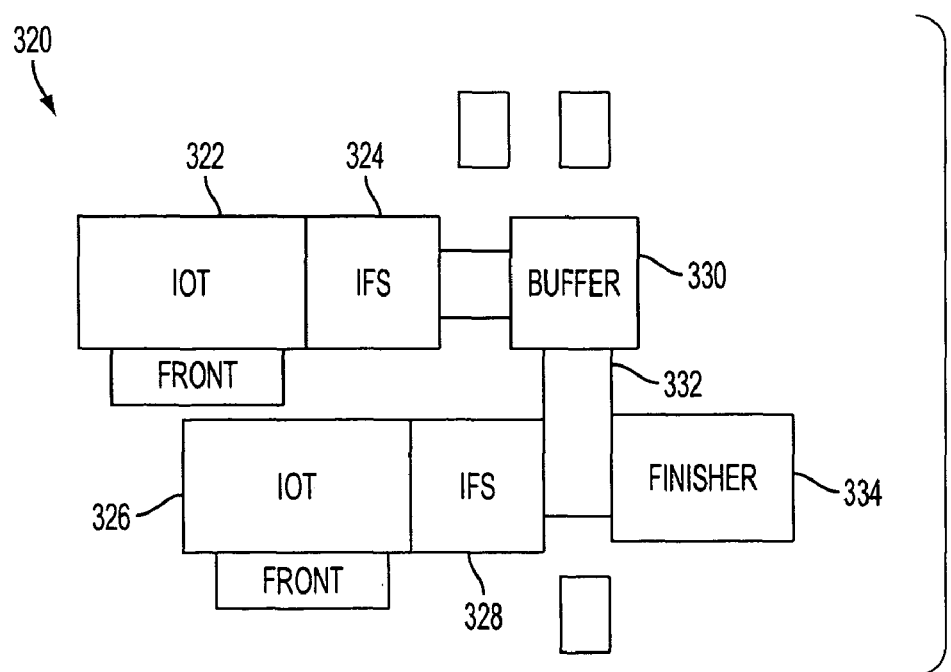
FIG. 8 is a block diagram of an alternative printing system.

As shown in FIG. 8, a system 320 includes a first IOT 322, a first IFS 324, a second IOT 326, and a second IFS 328. The output from the first IOT 322 and the first IFS 324 are fed into a buffer 330, which includes a bump and turn mechanism. The output from the buffer 330 is fed to a low level transport 332, which rotates the output 90 degrees straight into a finisher 334.

Figure 9:
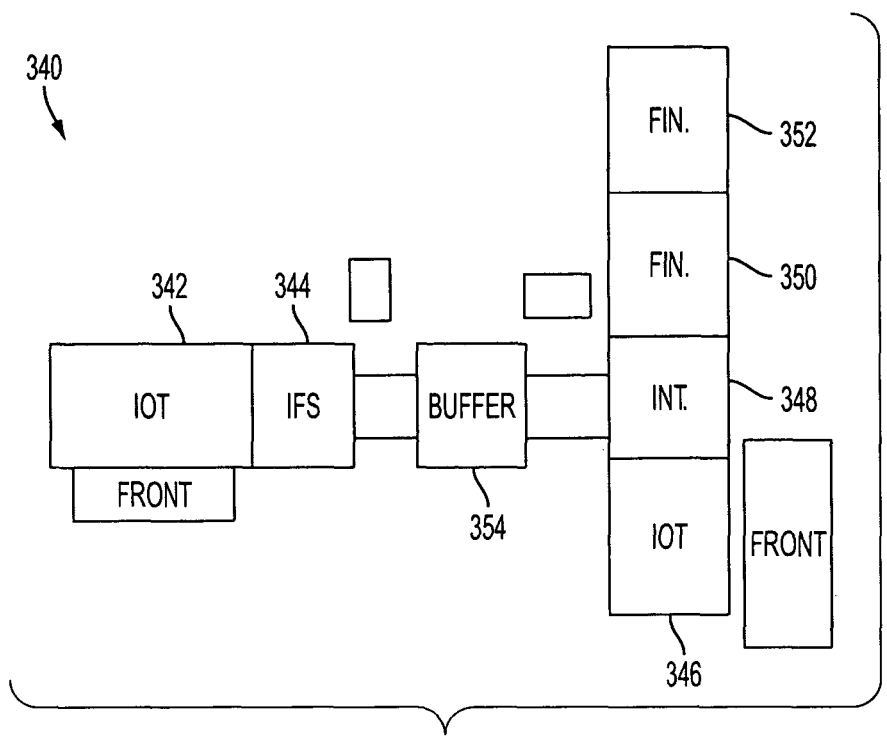
FIG. 9 is a block diagram of an alternative printing system.

FIG. 9 shows a system 340, which includes a first IOT 342, a first IFS 344, a second IOT 346, an interposer module 348 (containing additional paper supply trays), a first finisher 350, and a second finisher 352. The system 340 also includes a buffer 354 located between the IFS 344 and the interposer 348, which includes a bump and turn mechanism, an accumulation mechanism, an FIFO (first-in first-out) feeder and a rotator.

Figure 10:
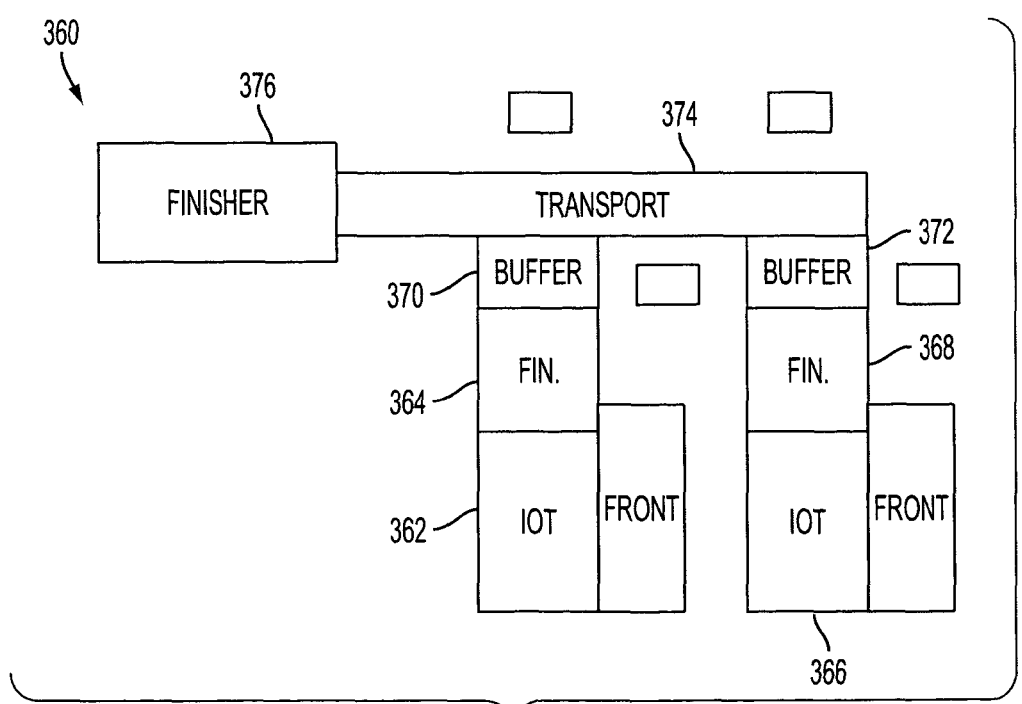
FIG. 10 is a block diagram of an alternative printing system.

FIG. 10 shows a system 360, which includes a first IOT 362, a first finisher 364, a second IOT 366, and a second finisher 368. The output from each finisher transport is transported to separate buffers 370, 372, respectively. From there, the output from each buffer 370, 372 are transported along a transport 374 to a third finisher 376. The functions of the buffers 370, 372 include accumulation, FIFO feeding, and the buffer outputs are interleaved to provide two times the input to the third finisher 376.

Figure 11:
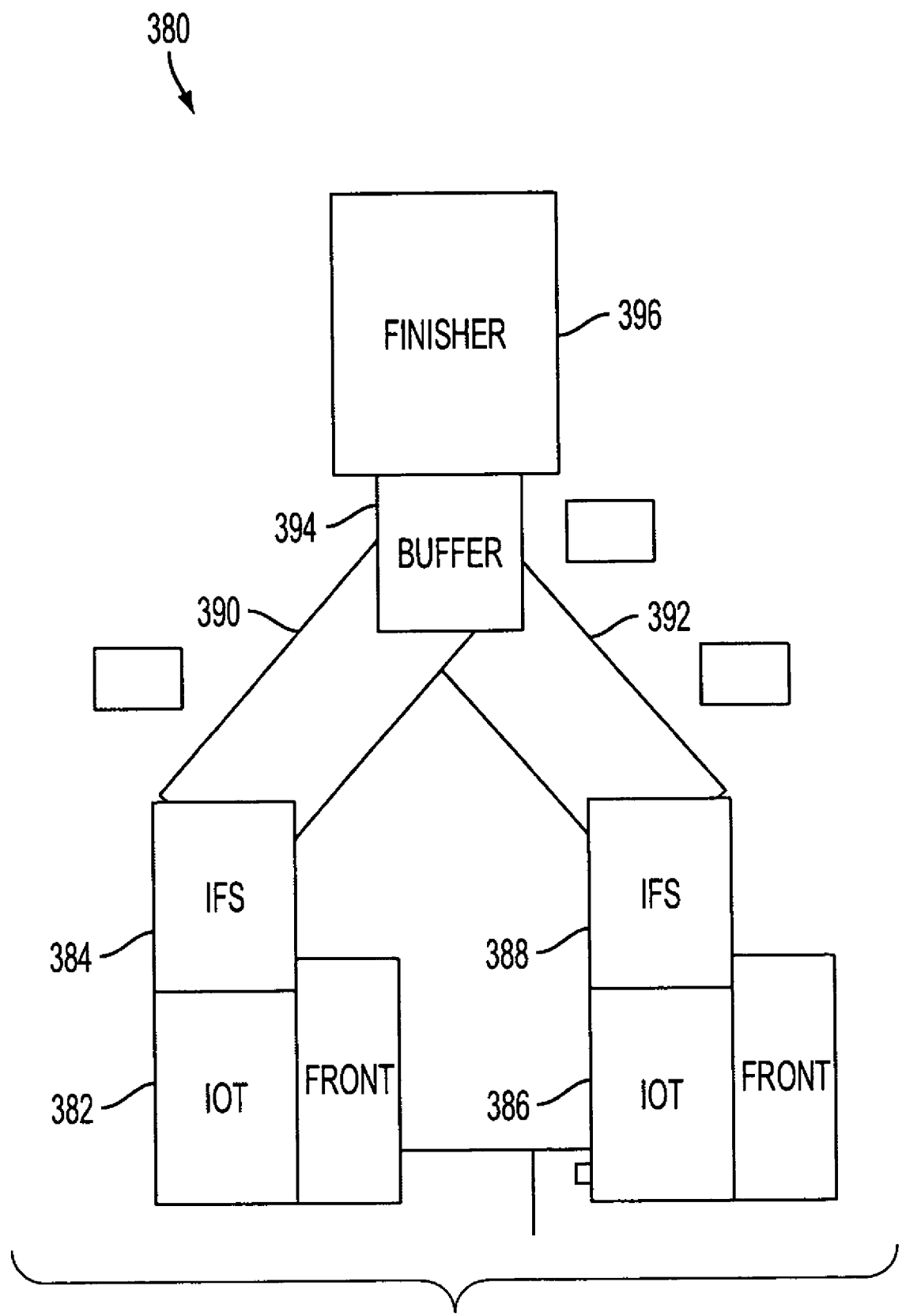
FIG. 11 is a block diagram of an alternative printing system.

FIG. 11 shows a system 380, which includes a first IOT 382, a first IFS 384, a second IOT 386, and a second IFS 388. The output from the first IFS 384 travels along a first transport 390, while the output from the second IFS 388 travels along a second transport 392. The output from the transports, 390, 392 travels to a buffer 394, which feeds a finisher 396. The buffer 394 includes functions such as accumulation and an FIFO feeder, and the buffer interleaves the outputs from the two IOTs to provide two times the input to the finisher 396.

Figure 12:
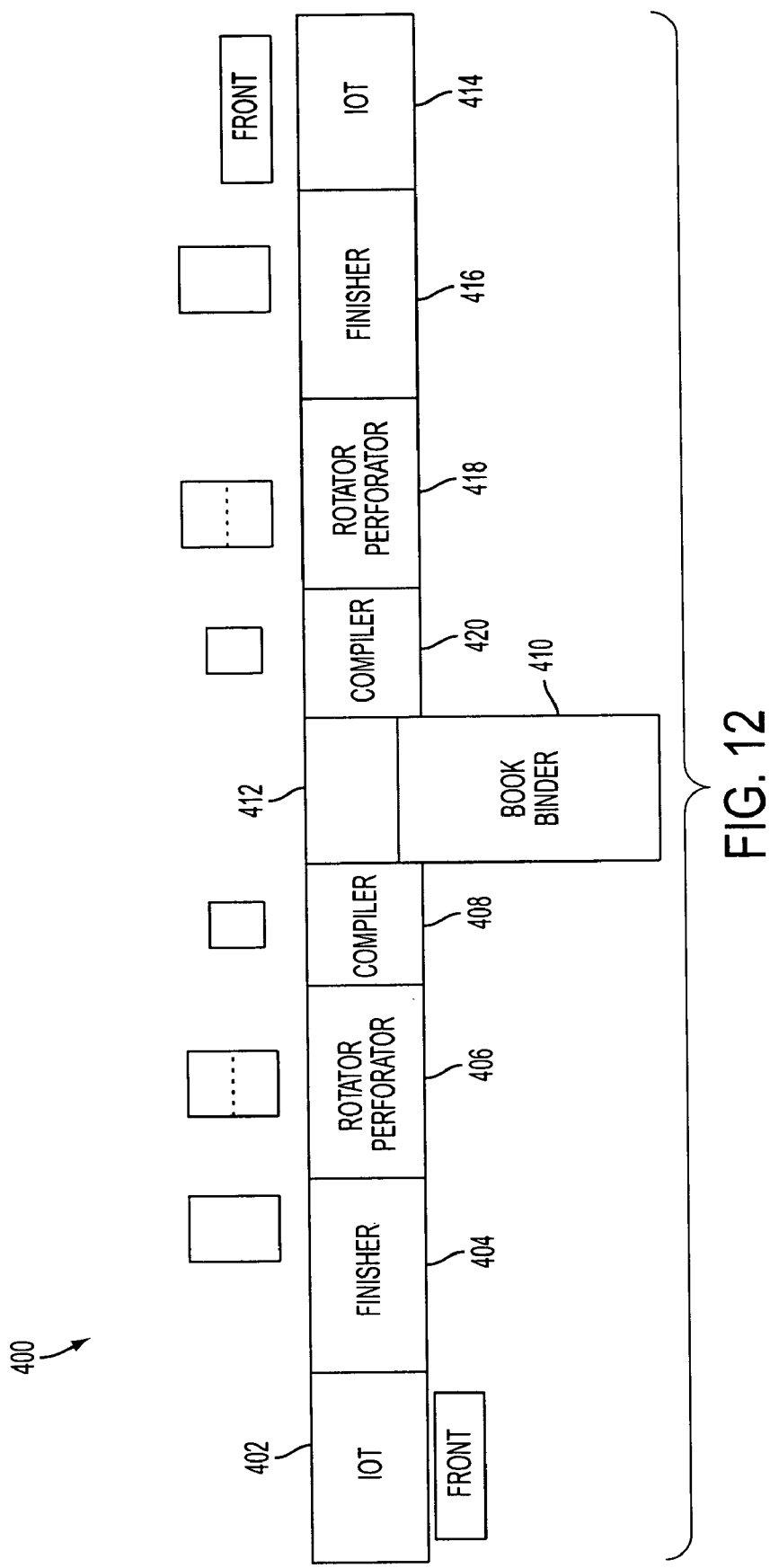
FIG. 12 is a block diagram of an alternative printing system.

FIG. 12 shows a system 400, which includes a first IOT 402, a first 6180 finisher 404, a first rotator perforator 406, and a first compiler 408. The system 400 also includes a second IOT 410, a second Xerox DocuTech 6180 printer 412, a second rotator perforator 414, and a second compiler 416. The output from the compilers 408, 416 is fed to a buffer 418, whereby it is then fed to a bookbinder 420, such as a C. P. Bourg Book Binder.

Figure 13:
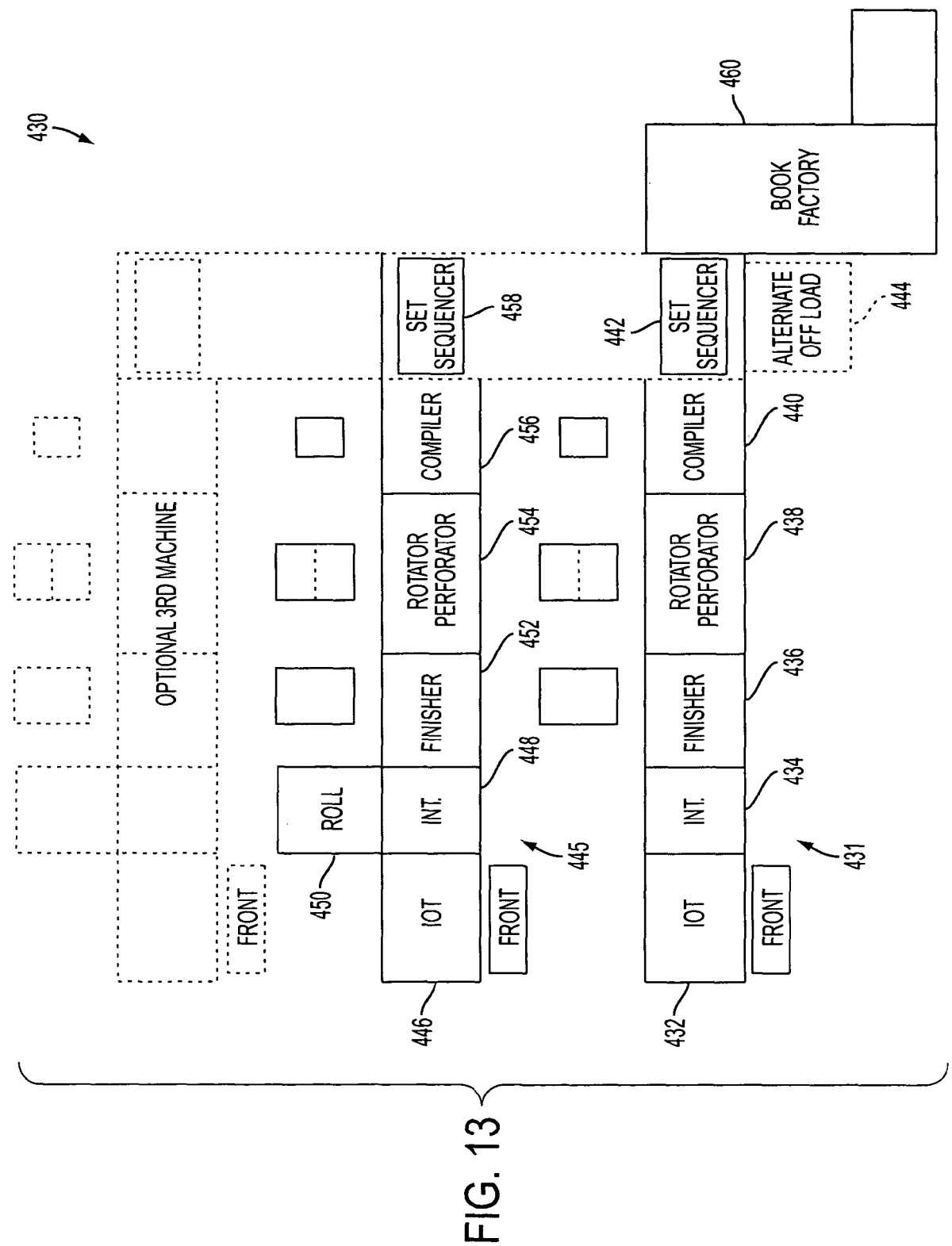
FIG. 13 is a block diagram of an alternative printing system.

FIG. 13 shows a system 430, which includes a plurality of bookbinding machines. The first machine 431 includes a first IOT 432, a first interposer 434, a first finisher 436 such as a Xerox DocuTech 6180 printer, a rotator perforator 438, and a compiler 440. The output from the compiler 440 is fed to a first set sequencer 442. The output from the set sequencer 442 may be fed to an alternate off-load mechanism 444. The second machine 445 includes a second IOT 446, a second interposer 448, a roll mechanism 450, a second finisher 452 such as a Xerox DocuTech 6180 printer, a rotator perforator 454, and a compiler 456. The output from the compiler 456 is fed to a second set sequencer 458. The output from the set sequencers 442, 458 is fed to a book factory 468, such as a C. P. Bourg book factory.

The embodiments disclosed herein enable the matching of low and high speed engines, low and high image quality engines, low and high cost engines, or any other attribute that a user specifies. Thus, these embodiments offer various advantages, including reducing print shop labor and equipment cost for post printing collation of output sets, providing automated mono-color mixed output printing, reducing human error and waste involved with post-printing collation of output sets, improving mixed monochrome+color, monochrome+MICR, MICR+color, etc. print job turn around time, lowering the cost per page for monochrome printing with color or MICR capability, allowing users the opportunity to select the "right" type of print engines that best fits their needs, enabling the use of low speed color engines mated with high speed monochrome engines with no productivity degradation under most conditions, allowing users to use their printers either as two completely independent printers or use them as a single mono+color system without any physical configuration changes, allowing users to have two different finishing options available for a single merging system and then select between them due to the rotator that can take input from either of the two print engines and redirect the output to the finisher at approximately 90 degrees to the original engine, and being applicable to existing monochrome production engines and entry production color engines.

In addition, product development time and product acquisition spending are relatively low due to the design of a single generic module and controller that can be then used with many different marking engines. The multi-sheet buffer as configured enables the ability to feed color inserts from any buffer enabling the ability to reorder the color inserts and hold defective prints in the buffer and replace with a remade "good" print. The merging module is a single universal interface module for a multitude of products and a single merging module is very cost effective with respect to system integration and testing. Once a marking engine is qualified with the merging module, it can be used in combination with the same or any other marking engine.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   starting a mixed output print job including a predetermined number of document sets to be printed using a printing system including perpendicular first and second bypass transport paths connecting first and second print engines to corresponding ones of first and second finishers and at least one redirect path connecting the first and second print engines to opposite ones of the second and first finishers;
   determining whether outputs from the first and second print engines will be merged;
   where the outputs of the first and second print engines are to be merged,
   sending the output from the first print engine to the first finisher on a sheet-by-sheet basis using the first bypass transport path;
   simultaneously diverting output from the second print engine away from the second bypass transport path;
   redirecting the output from the second print engine to a buffer, the output being stored in the buffer before the redirect path merges with the first bypass transport path;
   scheduling a feeding of the output from the buffer into the redirect path;
   rotating the output in the redirect path for merging with the output in the first bypass transport; and
   delivering the merged output to the first finisher.

2. The method defined in claim 1 wherein at least one of the print engines comprises a monochrome print engine.

3. The method defined in claim 1 wherein at least one of the print engines comprises a MICR print engine.

4. The method defined in claim 1 wherein at least one of the print engines comprises a color print engine.

5. The method defined in claim 1 further comprising:
   when the outputs are to remain independent:
      relinquishing control to the local controls of the first and second print engines; and
      running the jobs separately.

6. The method defined in claim 1 further comprising:
   when the outputs are to remain independent:
      transporting the output from the first print engine to the first bypass transport and then to the output of the first finisher; and
      simultaneously transporting the output from the second print engine to the second bypass transport and then to the second finisher.

7. The method defined in claim 1 wherein processing the output from the second print engine comprises:
   buffering the output from the second print engine via a multi-sheet buffer having a plurality of buffer bins;
   the scheduling of the feeding of the output from the buffer corresponding with the sending of the output from the first engine on the sheet-by-sheet basis;
   rotating the output approximately 90 degrees from the second bypass transport path; and
   accelerating the output from the second print engine for merging the output into the first bypass transport path at a velocity equal to the velocity of the first bypass transport path.

8. The method defined in claim 1 further comprising:
   keeping track of each sheet in each buffer bin in the multi-sheet buffer; and
   each time a sheet is fed from a buffer bin, scheduling the next sheet to be printed and delivered to the empty buffer bin until the predetermined number of sets have been printed.

9. A system comprising:
   a first marking engine delivering output to a first finisher using a first bypass transport path;
   a second marking engine delivering output to a second finisher using a second bypass transport path, the second bypass transport path being perpendicular to the first bypass transport path;
   a gate for diverting the output from entering one of the first or second bypass transport paths and redirecting the output to a multi-sheet buffer; and,
   a redirect path for transporting the output from the buffer to an opposite one of the first and second bypass transport paths, the redirect path being perpendicular to the opposite one of the first and second bypass transport paths;
   wherein the buffer is a multi-sheet buffer including a plurality of sheet buffers, each sheet buffer being long enough to contain the largest sheet length entirely and a plurality of buffer paths, wherein each buffer path has a controllable decision gate to direct the sheets and each sheet buffer has separate drive control of a plurality of nip rollers for each buffer path to control each sheet.

10. The system defined in claim 9 wherein at least one of the marking engines comprises a monochrome marking engine.

11. The system defined in claim 9 wherein at least one of the marking engines comprises a MICR marking engine.

12. The system defined in claim 9 wherein at least one of the marking engines comprises a color marking engine.

13. The system defined in claim 9, further comprising a paper sensor to sense where the sheet lead or trail edge is in the print stream.

14. An apparatus for an image rendering system having at least two marking engines and at least one finisher, the apparatus comprising:
 a first marking engine delivering output to a first finisher using a first bypass transport path;
 a second marking engine delivering output to a second finisher using a second bypass transport path, the second bypass transport path being perpendicular to the first bypass transport path;
 a gate for diverting the output from entering one of the first or second bypass transport paths and redirecting the output to a multi-sheet buffer;
 a redirect path for transporting the output from the buffer into an opposite one of the first and second bypass transport paths, the redirect path being perpendicular to the opposite one of the first and second bypass transport paths; and,
 a scheduler for controlling a merging of the output from the first and second print engines by tracking the output delivered to and fed from the buffer;
 wherein the buffer is a multi-sheet buffer including a plurality of sheet buffers, each sheet buffer being long enough to contain the largest sheet length entirely and a plurality of buffer paths, wherein each buffer path has a controllable decision gate to direct the sheets and each sheet buffer has separate drive control of a plurality of nip rollers for each buffer path to control each sheet.

15. The apparatus defined in claim 14 wherein the image rendering system comprises a xerographic system.

16. The apparatus defined in claim 14 wherein the multi-sheet buffer further comprises a sheet sensor for sensing where the sheet lead or trail edge is in the image rendering system.

* * * * *